March 8, 1960 W. B. FARRINGTON 2,927,459
MEASUREMENT OF SUBSURFACE STRESS
Filed July 18, 1957 2 Sheets-Sheet 1

INVENTOR.
WILLIAM B. FARRINGTON,
BY
ATTORNEY.

March 8, 1960

W. B. FARRINGTON 2,927,459

MEASUREMENT OF SUBSURFACE STRESS

Filed July 18, 1957

INVENTOR.
WILLIAM B. FARRINGTON,

BY John B. Davidson

ATTORNEY

United States Patent Office 2,927,459
Patented Mar. 8, 1960

2,927,459

MEASUREMENT OF SUBSURFACE STRESS

William B. Farrington, Montclair, N.J., assignor, by mesne assignments, to Jersey Production Research Company, Tulsa, Okla., a corporation of Delaware Application July 18, 1957, Serial No. 672,825

5 Claims. (Cl. 73—151)

This invention relates to the art of geophysical exploration and more particularly to the determination of stresses existing in the subsurface strata.

It has been known in the past that a knowledge of pre-existing stresses in subsurface geological formations can be quite useful in determining the presence of structure such as salt domes that can lead to the discovery of petroleum deposits. While it may be desirable to know the magnitude of such stresses for such purposes, a knowledge of the direction of the maximum horizontal stress component alone can be useful, particularly in determining the direction of geologic structure with respect to a given reference point.

Methods of measuring subsurface stresses found in the prior art require obtaining core samples from the strata under consideration. Certain disadvantages arising from such procedures are readily apparent, not the least of which is the difficulty of obtaining accurate information as to the absolute orientation of the core sample in its original location and the possibility of disturbance of original stresses conditions in the process of removing the sample.

One object of this invention is to provide apparatus and method for obtaining information relative to the direction of the horizontal component of maximum stress in a subsurface geological strata.

Another object is to provide method and apparatus for obtaining information relative to the direction of the horizontal component of maximum stress from measurements made in a borehole.

Still another object is to provide apparatus for measuring the horizontal component of stress in a geological strata from a remote location while leaving all sections of the strata substantially in place.

In accordance with the teachings of the present invention, the sides of a borehole penetrating a given subsurface strata are subjected first to pressure of one value and then to pressure of a higher value. It has been known in the past that Young's modulus of elasticity for some rocks is non-linear, the strain produced by a given stress thereon decreasing as the magnitude of the stress increases. Therefore, the increase in the diameter of the borehole produced by a given increased in pressure on the sides of the borehole will vary in accordance with the original stress condition existing in the strata, the greatest increase in diameter being in the direction of minimum horizontal stress. By very accurately measuring the increase in diameter and plotting the results in polar coordinates, the direction of maximum horizontal stress can be readily determined.

Various other objects and features of the present invention will become readily apparent upon consideration of the following description thereof when taken in connection with the accompanying drawings, wherein.

Figures 1, 2, 3:
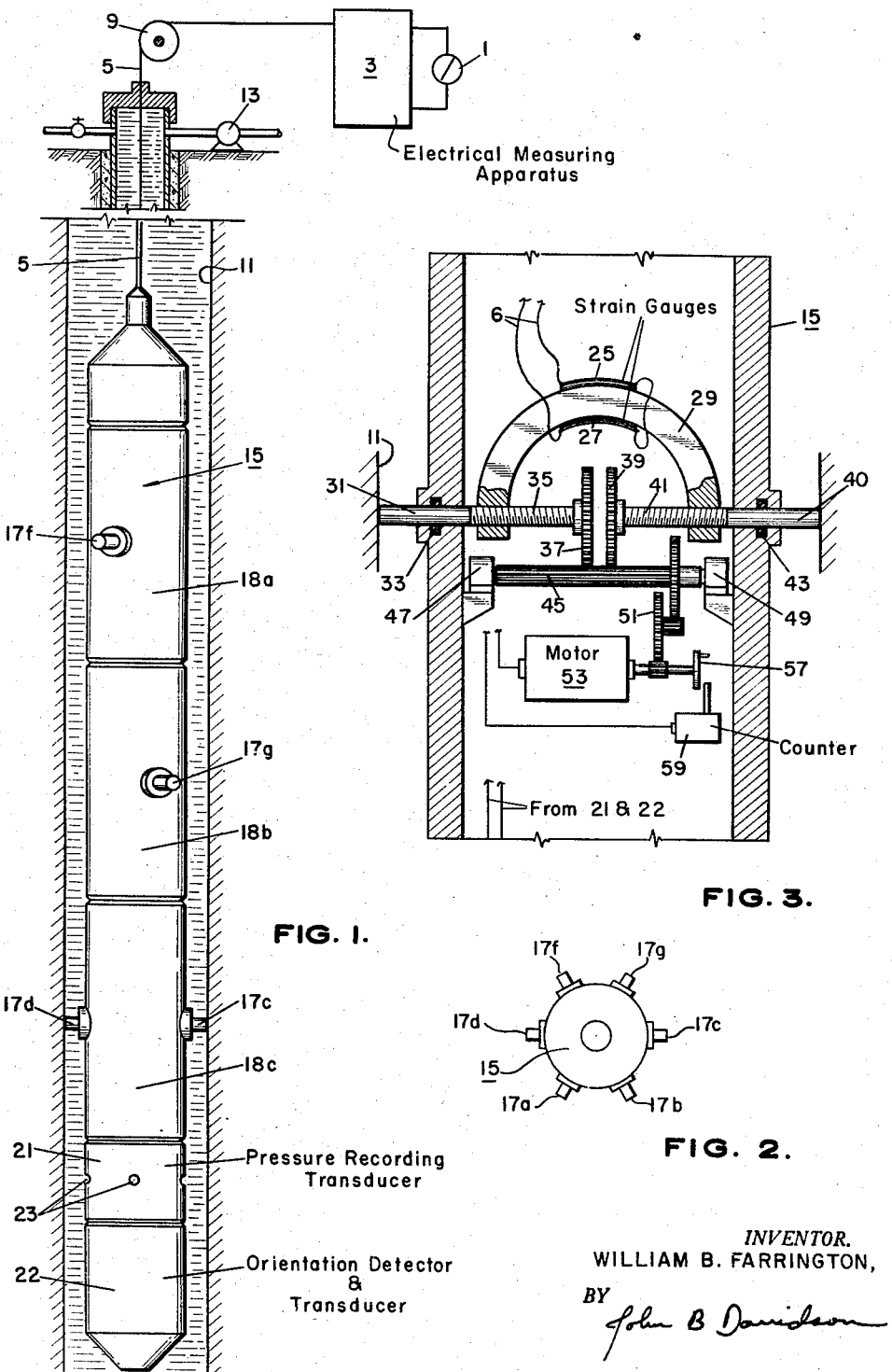
Fig. 1 is an elevation view, partly in schematic form, of a typical device constructed in accordance with the teachings of the invention in place in a borehole.
Fig. 2 is a bottom view of the sonde portion of the apparatus shown in Fig. 1.
Fig. 3 is a side elevation view, partially in cross section, of one embodiment of apparatus constructed in accordance with the invention.

With reference now to Fig. 1, there is shown a sonde 15 in place in a borehole 11, supported therein by the usual winch 9, and having a cable 5 including electrical leads which are connected to electrical measuring apparatus 3, the function of which will become apparent below. The output of the electrical measuring apparatus is coupled to a meter 1, which may be either an ammeter or a voltmeter, as convenient.

The sonde 15 has a multiplicity of borehole diameter measuring sections 18a, 18b, and 18c, from which project probes 17a, 17b, 17c, 17d, 17e, and 17f, which, in combination with the apparatus described, function to measure the diameter of the borehole in at least three different directions. As shown more clearly in Fig. 3, wherein is shown one of the sections 18a, 18b, or 18c, the probes comprise a pair of rods 31 and 40, the inner sections of which are screw threaded in opposite senses. As shown, section 35 of rod 31 has right-hand screw threads, and section 41 of rod 40 has left-hand screw threads. O rings 33 and 43 function to provide a fluid-tight seal for rods 31 and 40.

A clevis or U-shaped member 29 having a curved section and a pair of substantially parallel side arms is provided for the purpose of indicating when the probes meet substantial opposition as they move outwardly from the walls of the sonde. The arms of clevis 29 are drilled and internally screw threaded so as to match the screw threads on the sections 35 and 41 of rods 31 and 40, respectively. For the purpose of measuring the amount of flexure of the clevis, strain gages 25 and 27 may be of the type having very fine electrical conductors, the resistance of which varies in accordance with the cross sectional area. Changes in the length of the conductors produced by flexing the clevis will vary the cross sectional area of the wires and the length of the wires and thus change the resistance thereof and the current flowing therethrough. A pair of leads 6 may be connected to the strain gage and to the electrical measuring apparatus through the cable 5. The function of the electrical measuring apparatus is to measure the resistance of the strain gages 25 and 27. A convenient embodiment for electrical measuring apparatus 3 is a pair of resistances connected to the strain gages so as to form a Wheatstone bridge, the output of which is measured by electrical measuring apparatus and meter 1.

Attached to the inner ends of threaded rod sections 35 and 41 are a pair of spur gears 37 and 39, which mesh with pinion gear 45, the ends of the pinion gear being supported by bearings 47 and 49. The pinion gear is driven by motor 53 through gear train 51. Motor 53 may be a reversible shunt-field D.C. motor having an armature (not shown) electrically connected to an electrical resistance measuring apparatus at the earth's surface through cable 5. Also attached to the shaft of motor 53 is a counting wheel 57, having a projection thereon for actuating a mechanical counter 59. Output indications from counter 59 may be transmitted by lead 61 to the surface through cable 5.

Returning now to Fig. 1, as part of the sonde there are also included a pressure recording transducer 21 and an orientation detector and transducer 22. The pressure recording transducer may be any of the conventional types of devices for recording the pressure of well fluid through apertures 23 in the shell of the sonde. The orientation detecting and transducing device may be an arrangement such as a compass and a camera for photographing the compass face, or a photoelectric scanning arrangement such as described in the co-pending application of A. L. Gaudin for "Inclinometer," Serial No. 621,055, filed November 8, 1956, and assigned to the assignee of the present invention, now U.S. Patent No. 2,851,785.

The operation of the apparatus described above is as follows: Assume that a pump 13 is applying mud pressure of a given magnitude in the borehole. More specifically, let it be assumed that the mud pressure is 600 pounds per square inch. Motor 53 is energized so as to drive pinion gear 45 counterclockwise, looking at the gear from the right, so that rods 35 and 41 will be threaded through clevis 29 outwardly until the ends thereof touch the side of the borehole. When the ends of the rods 31 and 40 subject the sides of the borehole to sufficient pressure, they will stop moving outwardly but will continue rotating, so that the arms of clevis 29 will move inwardly, and the current through strain gages 25 and 27 will be varied. An electrical indication is sent through leads 6 to the electrical measuring apparatus 3, which, at a given reading, will indicate that a force sufficient to seat the rods 31 and 40 (and keep them seated through the operation to be described) is being exerted on the sides of the borehole by the rods. The motor is thereupon stopped. The pressure indication transmitted to the surface by transducer 21 and the orientation indication transmitted by member 22 are noted. The mud pressure is thereupon increased to a much higher magnitude but less than the pressure required to fracture the sides of the borehole, and the reading of pressure recording transducer 21 is noted. Motor 53 is again energized, and the number of motor revolutions required to produce the same electrical indication from strain gages 25 and 27 corresponding to the same force exerted on the sides of the borehole by rods 31 and 40 as was exerted previously at the lower mud pressure. (It should be noted that the instrument has to be calibrated in terms of rod movement as a function of motor revolutions.) The number of revolutions of the motor will be indicative of the increase in the diameter of the borehole as a result of the increase in mud pressure.

Figure 6:
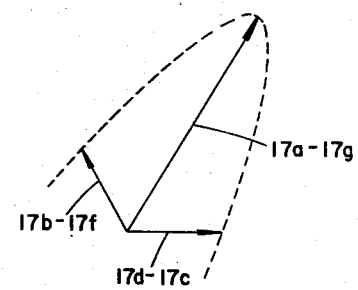
Fig. 6 is a polar diagram of typical measurements made with apparatus of the present invention, which diagram is useful in understanding the operation of the invention.

The procedure outlined above is followed for each of the borehole diameter measuring sections 18a, 18b and 18c. Due to the fact that the latent stresses in the subsurface strata will be different for the different directions in which borehole diameter was measured, the increase in diameter produced by a given increase in mud pressure will vary according to the direction along which borehole diameter is measured. Therefore, by plotting the increases in borehole diameter in polar coordinates as shown in Fig. 6, it will be noted that a maximum increase in borehole diameter will be indicated in a given direction and, therefore, it is in this direction that the maximum horizontal component of latent subsurface stress will be found to exist. In the example represented by Fig. 6, the direction of maximum stress would be a few degrees clockwise of the direction indicated by probes 17a and 17b.

Figure 5:
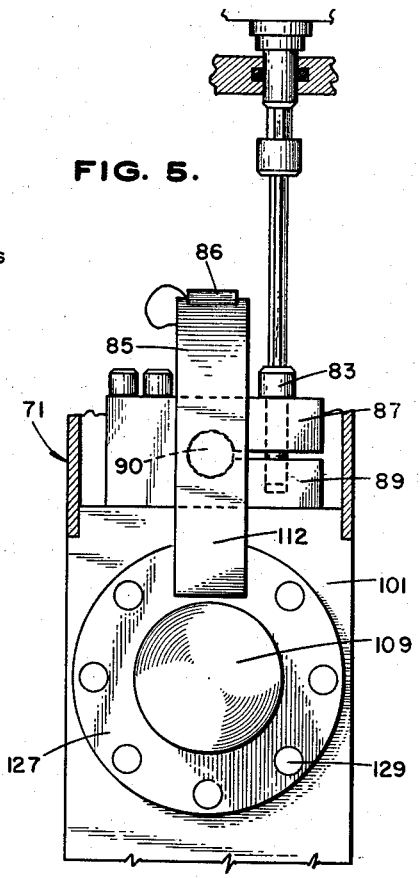
Fig. 5 is a side view of a portion of the apparatus of Fig. 4.
Figure 4:
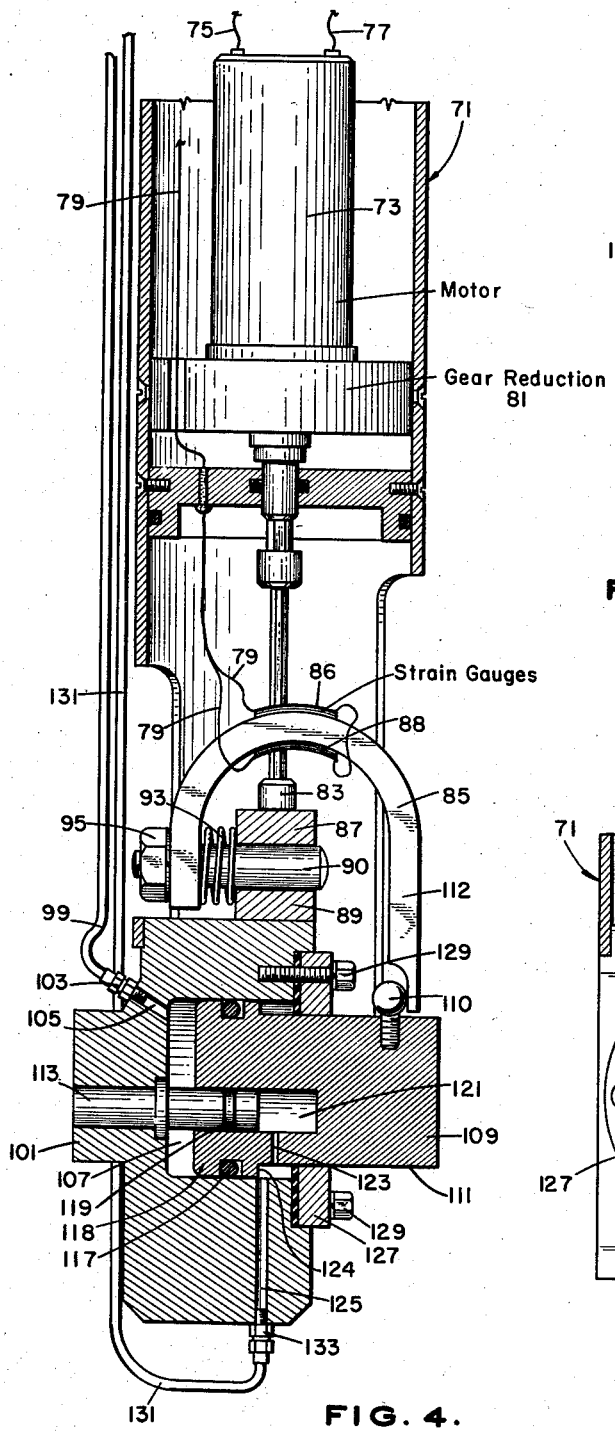
Fig. 4 is a side elevation of another embodiment of apparatus constructed in accordance with the invention.

In Figs. 4 and 5, there is illustrated another embodiment of the invention which does away with the necessity of varying the mud pressure. The sonde enclosure in Fig. 4 is designated by reference numeral 71 and supports a body member 101 within which has been drilled a well or piston cylinder 107. Within the piston cylinder is a piston 109, having a section 118 of larger diameter than the other section 111 thereof. Reduced section 111 is in smooth fitting relationship with an annular collar 127 affixed to body member 101 by means of a multiplicity of bolts 129. The enlarged head 118 of piston 109 is in smooth fitting relationship with the sides of piston cylinder 107. O ring 117 provides a fluid seal between the interior of the shaft cylinder and the space defined by annular collar member 127, surface 124 of enlarged section 118, the outer surface of reduced section 111 between collar 127 and enlarged head 118 and the surface of the piston cylinder 107.

A clevis member 85 similar to the clevis 29 described above is selectively affixed to body member 101 by means of a clamping arrangement including bolt 90 secured to one arm of the clevis by means of nut 95, upper clamping member 87, lower clamping member 89, biasing spring 93, and clamp screw 83. Strain gages 86 and 88, similar to the strain gages described above, are secured to the curved section of the clevis 85. The bolt 90 may slide to the right or left within the clamp members 87 and 89 until clamp screw 83 presses down upon clamping member 87 so as to prevent such movement. Vertical movement of clamp screw 83 is controlled by clamp screw motor 73 through a gearing arrangement 81. Electrical leads 75 and 77 are provided for energizing clamp screw motor 73 from the surface. Electrical leads 79 transmit the output indications of strain gages 86 and 88 to the surface.

An expansion knob 110 is affixed to the upper side of piston 109 so as to bear against one arm 112 of clevis 85. Arm 112 may be dished out so as to provide a firm abutting surface for knob 110. In order to prevent rotation of the piston 109, a guide 113 is affixed to body member 101 so as to project into a well 121 within piston 109 off-center of the piston. An O ring 119 provides a fluid seal between the interior of piston chamber 107 and the interior of well 121. In order to bleed off fluid that may leak past O ring 119 into chamber or well 121, a small bore 123 is drilled between chamber 121 and the space defined by surface 124, collar 127, the outer surface 111 of piston 109 and the inner surface of piston cylinder 107.

For the purpose of injecting fluid pressure into piston cylinder 107 to move piston 109 outwardly of the cylinder, a port 105 is provided. A source of fluid pressure which may be provided by an electrically energized pump or by lines from the surface is coupled to port 105 by means of line 99 and connection 103. To move the piston 109 inwardly into the cylinder 107, a second fluid pressure line 131 is coupled to port 125 by means of connection 133. Port 125 opens into the chamber including surface 124. It should be noted that the area of surface 124 must be greater than the area of the end of guide 113, projecting into well 121, in order for the piston 109 to move to the left when line 131 is subjected to fluid pressure.

The operation of the embodiment of Figs. 4 and 5 is as follows: Assume that the clamp screw motor has backed off the clamp screw 83, so that bolt 90 is free to slide to the right and left. Spring 93 will be effective to bias clevis 85 to the left, so that arm 112 abuts against expansion knob 110. Line 99 is thereupon subjected to a small known pressure, for example 300 or 400 pounds per square inch, so as to move piston 109 to the right. When piston 109 and body member 101 abut against opposite sides of the borehole with a force that may be readily determined, knowing the pressure in line 99, clamp screw motor 73 is energized so as to clamp bolt 90 rigidly to body member 101. The pressure in line 99 is thereupon increased so as to move piston 109 outwardly again. Clevis 85 will be flexed so as to produce a measurable output from strain gages 86 and 88. The pressure being exerted upon the sides of the borehole may again be readily ascertained since the area of piston 109 and the pressure in line 99 are known. The change in output indications from strain gages 86 and 88 will be indicative of the outward movement of piston 109 with increase in the pressure exerted thereon through line 99. As soon as the desired measurements have been made, the pressure on line 99 is relieved, and line 131 is pressurized. Clamp screw motor 73 is reversed, and piston 109 and clevis 85 are retracted to their original positions. By utilizing several devices such as shown in Figs. 4 and 5, or by re-orienting the apparatus and making several measurements as described above, variations in borehole diameter with increase in applied pressure to the sides of the borehole may be obtained and a diagram as shown in Fig. 6 and as described above with respect to the apparatus of Figs. 1 and 2 may be readily obtained.

Manifestly, the objects specified above are capable of ready achievement by the method and apparatus described. With the apparatus aforedescribed, there is no necessity for removing any sections of the subsurface strata to obtain information as to the direction of the horizontal component of maximum stress in the strata, and all measuremens may be made directly from apparatus lowered into a borehole traversing the strata.

Although only certain specific embodiments of the invention have been shown and described, it must be understood that there are many modifications thereof which may be readily brought about; therefore, the invention is not to be restricted except insofar as indicated by the scope of the present disclosure.

What is claimed is:

1. Apparatus for measuring horizontal stress in a borehole comprising: a body member including a piston cylinder well, a piston adapted to reciprocate in said piston cylinder and having a face adapted to bear against the side of said borehole; means including fluid port means opening into said cylinder well for applying fluid pressure of determinable magnitude to said cylinder to force said piston out of said well; a U-shaped spring clevis; means connecting said clevis to said body member including a bolt connected to one arm of said clevis adapted for reciprocating movement within a motor actuated clamping member affixed to said body member; and knob means affixed to said piston for bearing against the other arm of said clevis as said piston moves outwardly under the impetus of said fluid pressure; electrical strain gage means mounted on the curved portion of said clevis to measure the magnitude of outward movement of said piston after clamping of said bolt.

2. Apparatus for measuring horizontal stress in a borehole comprising: a cylinder block having at least one piston cylinder within which is positioned a piston member adapted for bi-directional movement, one face of said piston being adapted for bearing against the side of said borehole; first means including first port means for injecting fluid of predetermined pressure into said cylinder to force said piston member outwardly of said cylinder; said piston member having a section of reduced diameter in sliding fit with a ring affixed to said cylinder block around the entrance to said cylinder to define a second piston and cylinder for moving said piston member inwardly into said cylinder block upon injection of pressurized fluid thereinto; second means including second port means for injecting pressurized fluid into said second piston cylinder; a U-shaped spring clevis; means connecting said clevis to said body member including a bolt connected to one arm of said clevis adapted for reciprocating movement within a motor actuated clamping member affixed to said cylinder block; and knob means affixed to said piston for bearing against the other arm of said clevis as said piston member moves outwardly under the impetus of said fluid pressure; electrical strain gage means mounted on the curved portion of said clevis to measure the magnitude of outward movement of said piston member after clamping of said bolt.

3. Apparatus for measuring horizontal stress in a borehole comprising: a U-shaped member having a curved section and first and second substantially parallel arms affixed thereto; electrical strain gage means mounted on said curved section and adapted to produce an output voltage having a magnitude variable in accordance with the flexure of said curved section; piston means and piston cylinder means in interfitting relationship for exerting pressure on opposing sides of said borehole in accordance with the pressure of a fluid injected therebetween; connecting means connecting one of said arms of said U-shaped member to said piston cylinder means so that said piston means will bear against the other of said arms to flex said curved section so that said magnitude of said output voltage is indicative of the movement of said piston cylinder means as it exerts pressure on the sides of said borehole; said connecting means including clamping means to selectively disengage said one arm from said piston cylinder means until said piston means and piston cylinder means bear against said opposing sides of said borehole.

4. Apparatus for measuring horizontal stress in a borehole comprising: a body member including a cylindrical well; an annular plate having a smaller interior diameter than the diameter of said well affixed to said body member at the entrance to said cylindrical well so as to be coaxial with said well; a piston having a first cylindrical portion in sliding fit with said cylindrical well and a second portion in sliding fit with said annular plate; a clevis spring member having a curved section and first and second substantially parallel arms integral with said spring member; means selectively connecting said clevis member to said body member including clamping vise means having a clamping bore therethrough substantially parallel to the axis of said well, a bolt affixed to said first arm for bi-lateral movement through said clamping bore, and biased away from said clamping vise means by spring means, and electric motor driven clamping screw for clamping said vise means to said bolt; a knob affixed to said piston engaging said second arm to flex said clevis means as said piston moves outwardly from said body member; electric strain gage means having an output voltage indicative of the magnitude of flexure of said clevis means; guide means for said piston means affixed to said body member within said well, parallel to and spaced from the longitudinal axis of said well, and extending into second cylindrical well means in said piston means; first port means for injecting fluid of determinable pressure into said well to force said piston outwardly from said body member, and second port means for injecting pressurized fluid into said well between said annular member and said first cylindrical portion of said piston to force said piston into said body member.

5. Apparatus in accordance with claim 4 wherein fluid vent means between said second cylindrical well means and said second port means bleeds fluid from said second cylindrical well.

References Cited in the file of this patent

UNITED STATES PATENTS

| | | |
|---|---|---|
| 2,398,562 | Russell | Apr. 16, 1946 |
| 2,612,774 | Zerner | Oct. 7, 1952 |
| 2,677,271 | Faris et al. | May 4, 1954 |
| 2,824,445 | Reese | Feb. 25, 1958 |

FOREIGN PATENTS

| | | |
|---|---|---|
| 568,912 | Germany | Jan. 26, 1933 |